United States Patent
Kusano

[19]

[11] Patent Number: 5,927,425
[45] Date of Patent: Jul. 27, 1999

[54] TORQUE DISTRIBUTION CONTROL SYSTEM FOR AUTOMOTIVE VEHICLES

[75] Inventor: Masahiro Kusano, Kanagawa, Japan

[73] Assignee: Nissan Motor Co., Ltd., Yokohama, Japan

[21] Appl. No.: 08/822,954

[22] Filed: Mar. 21, 1997

[30] Foreign Application Priority Data

Mar. 21, 1996 [JP] Japan ..................... 8-064631

[51] Int. Cl.$^6$ ............................... B60K 17/344
[52] U.S. Cl. ............................................ 180/248
[58] Field of Search ..................... 180/248, 249, 180/244; 701/69

[56] References Cited

U.S. PATENT DOCUMENTS

| | | | |
|---|---|---|---|
| 4,757,870 | 7/1988 | Torii et al. | 180/233 |
| 4,966,249 | 10/1990 | Imaseki | 180/233 |
| 5,032,995 | 7/1991 | Matsuda et al. | 364/424 |
| 5,119,298 | 6/1992 | Naito | 364/426 |
| 5,287,941 | 2/1994 | Masuada et al. | 180/197 |
| 5,448,478 | 9/1995 | Eto | 364/424.1 |
| 5,501,311 | 3/1996 | Wakahara | 192/85 R |
| 5,839,084 | 11/1998 | Takasaki et al. | 701/67 |

FOREIGN PATENT DOCUMENTS

| | | | |
|---|---|---|---|
| 39 42 411 | 6/1990 | Germany . | |
| 62-299431 | 12/1987 | Japan | 180/248 |
| 1-299722 | 9/1989 | Japan . | |
| 2-68225 | 3/1990 | Japan . | |
| 3-31031 | 2/1991 | Japan . | |

*Primary Examiner*—Lanna Mai
*Assistant Examiner*—Faye M. Fleming
*Attorney, Agent, or Firm*—Foley & Lardner

[57] ABSTRACT

A torque distribution control system for an automotive vehicle comprises a friction clutch adapted to distribute an engine power between front and rear road wheels or between left and right road wheels, a sensor provided for monitoring wheel speeds, a control unit being responsive to the wheel speeds for computing a wheel-speed difference and for computing a command signal value indicative of an engagement force to be applied to the friction clutch in response to the wheel-speed difference, and an actuating device for actuating the friction clutch in response to the command signal value. The control unit has a processor for discriminating whether the vehicle is in a specified running state in which it is possible to precisely compute a specific wheel-speed difference, occurring due to a difference in outside diameter of tires. The processor compensates for the wheel-speed difference on the basis of the specific wheel-speed difference at the time when the vehicle is in the specified running state and the fluctuations in the engagement force take place due to the different-diameter tire installed.

8 Claims, 5 Drawing Sheets

TORQUE DISTRIBUTION CONTROL SYSTEM FOR AUTOMOTIVE VEHICLES

BACKGROUND OF THE INVENTION

1. Field of the Invention

The present invention relates to an automotive torque distribution control system, and specifically to a system which is applicable to actively vary a distribution ratio of a portion of the torque delivered to a pair of subsidiary drive wheels (e.g., front road wheels) to the remaining portion of the torque delivered to a pair of primary drive wheels (e.g., rear road wheels), to actively vary a torque-distribution ratio between left and right road wheels by varying a differential limiting force of a differential mechanism interposed between the left and right road wheels, or to actively vary a torque-distribution ratio between front and rear road wheels by varying a differential limiting force of a center differential mechanism.

2. Description of the Prior Art

In recent years, there have been proposed and developed various automotive traction control systems which are adopted on four-wheel-drive vehicles with a torque-split transfer device, or a four-wheel-drive vehicles with a center differential interposed between front and rear road wheels or on a vehicle with a limited slip differential interposed between right and left road wheels, in order to enhance the driving stability of the vehicle and to secure a good traction. Such automotive torque distribution control systems have been disclosed in Japanese Patent Provisional Publication Nos. 1-229722 and 3-31031 both assigned to the assignee of the present invention. For instance, on four-wheel-drive vehicles with a typical torque distribution control system in combination with a transfer clutch, the system serves to varying the engaging force of the transfer clutch in response to a wheel-speed difference between front and rear wheel speeds, so as to prevent wheel-spin when accelerating or starting rapidly, to prevent wheel-lock which might occur at either one of left and right road wheels during hard braking, and/or to prevent wheel-slip during driving on so-called low-$\mu$ roads or split-$\mu$ roads. As is generally known, the greater the wheel-speed difference, the greater the engaging force of the transfer clutch, thus permitting the vehicle to shift from two-wheel-drive to four-wheel-drive. This can prevent excessive torque from being delivered to the road wheels and provide adequate traction depending on road surface conditions. Suppose that the outside diameter of either one of four tires is remarkably different from the other, for example owing to excessively worn tire, a different type or kind of tire located on the vehicle, fluctuations in manufacturing quality of tires, or an emergency tire often called "temper tire" installed on the car in case of emergency. In such a case, the conventional system decides that there is a difference between the rear- and front-wheel speeds, irrespective of during normal straight-ahead driving at a constant speed. The system tends to operate as if the vehicle experiences wheel-slip, even when there is less wheel-slip during normal straight-ahead driving. Generally, the system would rapidly increase the engaging force of the friction clutch of the transfer owing to the previously-noted wheel-speed difference based on installation of the tire of an outside diameter different from the other. As a result, excessive torque may be delivered to one of the front- and rear-ends of the vehicle. The undesired erroneous delivery of excessive torque might induce a new wheel-slip, and thus the system operates to release the transfer clutch in such a manner as to change from four-wheel-drive tendencies (a greater engaging force of the clutch) to two-wheel-drive tendencies (a less engaging force of the clutch). This results in hunting of the torque distribution control in the system. As appreciated, in the event that there is a comparatively great difference of outside diameters of the tires, the transfer clutch is continually maintained at its engaged position with a comparatively great clutch engagement force. This would lower the driving stability of the vehicle and degrade fuel consumption. This would also result in undesired oil-temperature rise in the torque-transmitting line or power-train components. Such temperature rise could work disadvantageously to the power-train components from the viewpoint of heat resistance. To avoid this, the previously-described Japanese Patent Provisional Publication No.1-229722 discloses a torque distribution control system which is capable of regulating the rate of change in an engagement force of a transfer clutch with respect to t (time), while making an estimate of hunting of the clutch engagement force, in response to the state of variations in a command torque or a command clutch-engagement force computed and determined by a controller incorporated in the system. The system of the Japanese Patent Provisional Publication No. 1-229722 merely reduces the rate of change in the clutch engagement force with respect to t (time) when the system estimates that hunting may start to develop. On the other hand, the Japanese Patent Provisional Publication No. 3-31031 teaches the compensation of a wheel-speed difference between the rear- and front-wheel speeds, considering the wheel-speed difference which might take place, owing to a tire of an outside diameter different from the other, during constant-speed straight-ahead driving. Actually, in the system disclosed in the Japanese Patent Provisional Publication No. 3-31031, the wheel-speed difference is detected on the basis of signals from a plurality of wheel-speed sensing devices, indicative of rear- and front-wheel speeds. The wheel-speed difference detected under a specified traveling condition is set at a so-called dead-band difference. A corrected wheel-speed difference is then computed by subtracting the dead-band difference from wheel-speed difference data, and thus the engagement force of the transfer clutch is controlled in response to a command signal value based on the corrected wheel-speed. However, there is a possibility that the system disclosed in the Japanese Patent Provisional Publication No. 3-31031 erroneously determines that the wheel-speed difference takes place due to a tire of an outside diameter different from the other even when the wheel-speed sensing device located on the front wheel side is in trouble and there is no current signal from the front wheel-speed sensing device. In this case, the system would malfunction so that driving torque might be delivered to the front wheels.

SUMMARY OF THE INVENTION

Accordingly, it is an object of the invention to provide an automotive torque control system which avoids the aforementioned disadvantages of the prior art.

It is another object of the invention to provide an automotive torque distribution control system which secures a proper torque distribution irrespective of the failure in wheel-speed sensor or installation of a tire of an outside diameter different from the other tires.

In order to accomplish the aforementioned and other objects of the present invention, a torque distribution control system for an automotive vehicle comprises a friction clutch adapted to distribute a torque produced by a prime mover between front and rear road wheels or between left and right road wheels, a sensing device provided for monitoring wheel speeds of the road wheels, a control unit being responsive to the wheel speeds, for computing a wheel-speed difference between rear- and front-wheel speeds or between left- and right-wheel speeds and for computing a command signal value indicative of an engagement force of the friction clutch in response to the wheel-speed difference, and an actuating device connected to the friction clutch to actuate the friction clutch in response to the command signal value, wherein the control unit has a processor for discriminating whether the vehicle is in a specified running state in which it is possible to precisely compute a specific wheel-speed difference, occurring due to a difference in outside diameter of tires fitted to the road wheels, wherein the processor decides whether fluctuations in the engagement force of the friction clutch take place due to a different-diameter tire installed at the vehicle, and wherein the processor compensates for the wheel-speed difference on the basis of the specific wheel-speed difference at the time when the processor decides that the vehicle is in the specified running state and the fluctuations in the engagement force take place due to the different-diameter tire installed.

It is preferable that the control unit has a memory for pre-storing a specified frequency range of fluctuations in the engagement force, occurring due to a difference in outside diameter between the different-diameter tire and another tire of a usual outside diameter, and that the processor decides that the fluctuations in the engagement force take place due to the different-diameter tire installed when an oscillation-frequency of the fluctuations is within the specified frequency range. The processor counts a first number indicating how many times the clutch engagement force exceeds a predetermined upper limit for a predetermined period of time and simultaneously counts a second number indicating how many times the clutch engagement force becomes less than a predetermined lower limit for the predetermined period of time. The processor decides whether the oscillation-frequency of the fluctuations is within the specified frequency range, by comparing the sum of the first and second numbers with a predetermined first value equivalent to a lower limit of the specified frequency range and with a predetermined second value equivalent to an upper limit of the specified frequency range. The specified running state may comprise at least one of a first condition in which the vehicle is above a predetermined vehicle speed, a second condition in which the vehicle is traveling at a constant speed, and a third condition in which a turn is not made. A torque distribution control system may further comprise a vehicle-speed sensing device for sensing a vehicle speed, a throttle-opening sensing device for sensing a throttle opening of a throttle valve, an engine-speed sensing device for sensing an engine speed, a longitudinal acceleration sensing device for sensing a longitudinal acceleration exerted on the vehicle, a brake lamp switch, a lateral acceleration sensing device for sensing a lateral acceleration exerted on the vehicle, and a steering angle sensing device for sensing a steering angle, and also the specified running state may comprise the first condition in which the vehicle speed is above a predetermined value, the second condition in which positive and negative fluctuations in the vehicle speed are within a predetermined range of fluctuations, the throttle opening is within a predetermined throttle opening, positive and negative fluctuations in the engine speed are within a predetermined range of fluctuations, the longitudinal acceleration is within a predetermined range, and a signal from the brake pedal is maintained at a zero signal level, and the third condition in which the lateral acceleration is within a predetermined range and positive and negative fluctuations in the steering angle are within a predetermined range of fluctuations. Preferably, the specified running state may further comprise a condition in which at least one of the first, second and third conditions are satisfied for a predetermined period of time.

According to another aspect of the invention, a method of varying a torque distribution between front and rear road wheels of an automotive vehicle or between left and right road wheels of the automotive vehicle, the vehicle having a variable-torque friction clutch for varying a torque distribution ratio of a torque delivered to the front wheels to a torque delivered to the rear wheels or a torque distribution ratio of a torque delivered to the left wheel to a torque delivered to the right wheel, the method comprises the steps of sensing wheel speeds of the road wheels, computing a wheel-speed difference between rear- and front-wheel speeds or between left- and right-wheel speeds, discriminating whether the vehicle is in a specified running state in which it is possible to precisely compute a specific wheel-speed difference, occurring due to a difference in outside diameter of tires fitted to the road wheels, comparing a frequency of fluctuations in an engagement force of the friction clutch with a specified frequency range of fluctuations in the engagement force, occurring due to a difference in outside diameter between a different-diameter tire and another tire of a usual outside diameter, deciding that fluctuations in an engagement force of the friction clutch take place due to a different-diameter tire installed at the vehicle when the vehicle is in the specified running state and the frequency of fluctuations in the engagement force of the friction clutch is within the specified frequency range, and compensating for the wheel-speed difference on the basis of the specific wheel-speed difference at the time when the vehicle is in the specified running state and the frequency of fluctuations in the engagement force of the friction clutch is within the specified frequency range. The step of discriminating the specified running state may include a step determining that the vehicle is in a straight-ahead, constant-speed driving state above a predetermined medium speed for a predetermined period of time.

DESCRIPTION OF THE PREFERRED EMBODIMENTS

Figure 1:
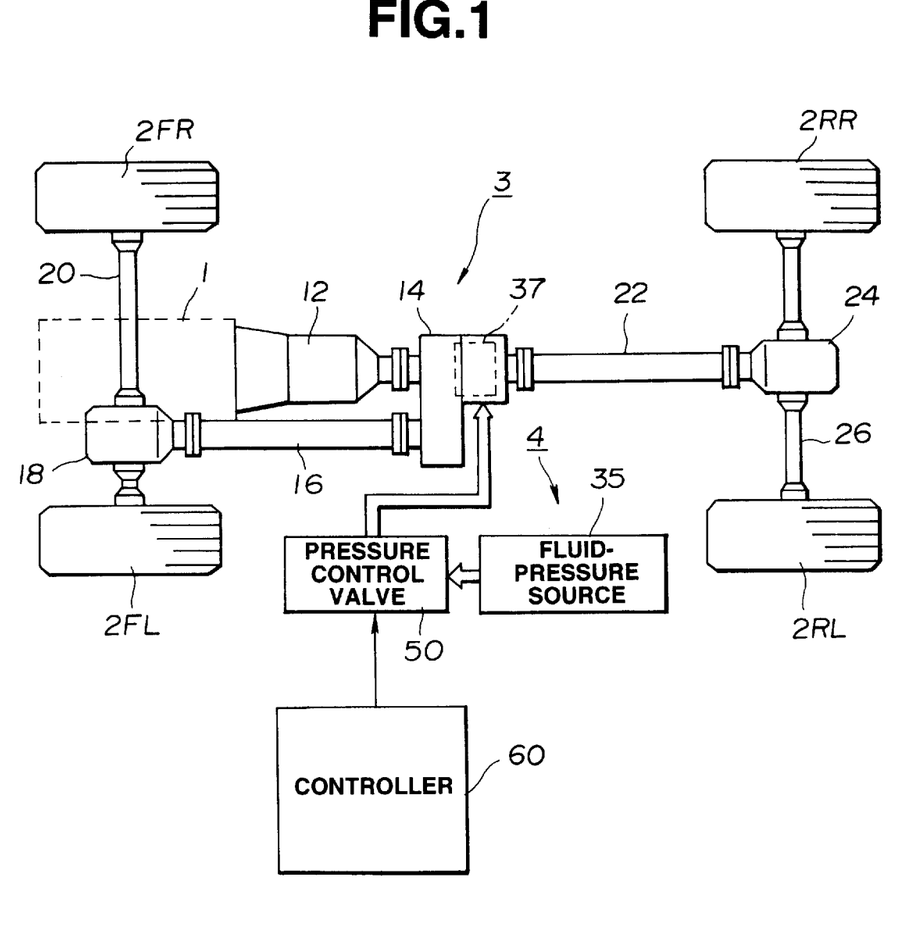
FIG. 1 is a system diagram illustrating one embodiment of an automotive torque distribution control system of the invention.

Referring now to the drawings, particularly to FIG. 1, the automotive torque distribution control system of the invention is exemplified in case of a motor vehicle of a four-wheel drive and front engine rear drive type. As shown in FIG. 1, the motor vehicle includes a prime mover such as an engine 1 followed by a clutch (not shown) and a transmission 12. Reference sign 3 denotes a drive train system for carrying the power from the engine 1 to the car wheels 2FL through 2RR, whereas reference sign 4 denotes a control system for controlling torque distribution over the four wheels 2FL through 2RR in cooperation with the drive train system 3. The power train system 3 includes the clutch (not shown) provided for permitting the driver to connect the engine crankshaft to or disconnect it from the power train and the transmission 12 provided for varying the gear ratio and for transmitting the engine power (driving torque) to the wheels with the gears placed in the selected gear ratio. Also provided is a transfer unit 14 (simply a transfer) for dividing the torque transmitted from the output shaft of the transmission into the front wheels 2FL and 2FR and the rear wheels 2RL and 2RR. A portion of the torque divided by the transfer is delivered through a front propeller shaft 16, a front differential 18 and front axle drive shafts 20 to the front wheels 2FL and 2FR, while the remaining portion of the torque divided by the transfer is delivered through a rear propeller shaft 22, a rear differential 24 and a rear axle drive shafts 26 to the rear wheels 2RL and 2RR.

Figure 2:
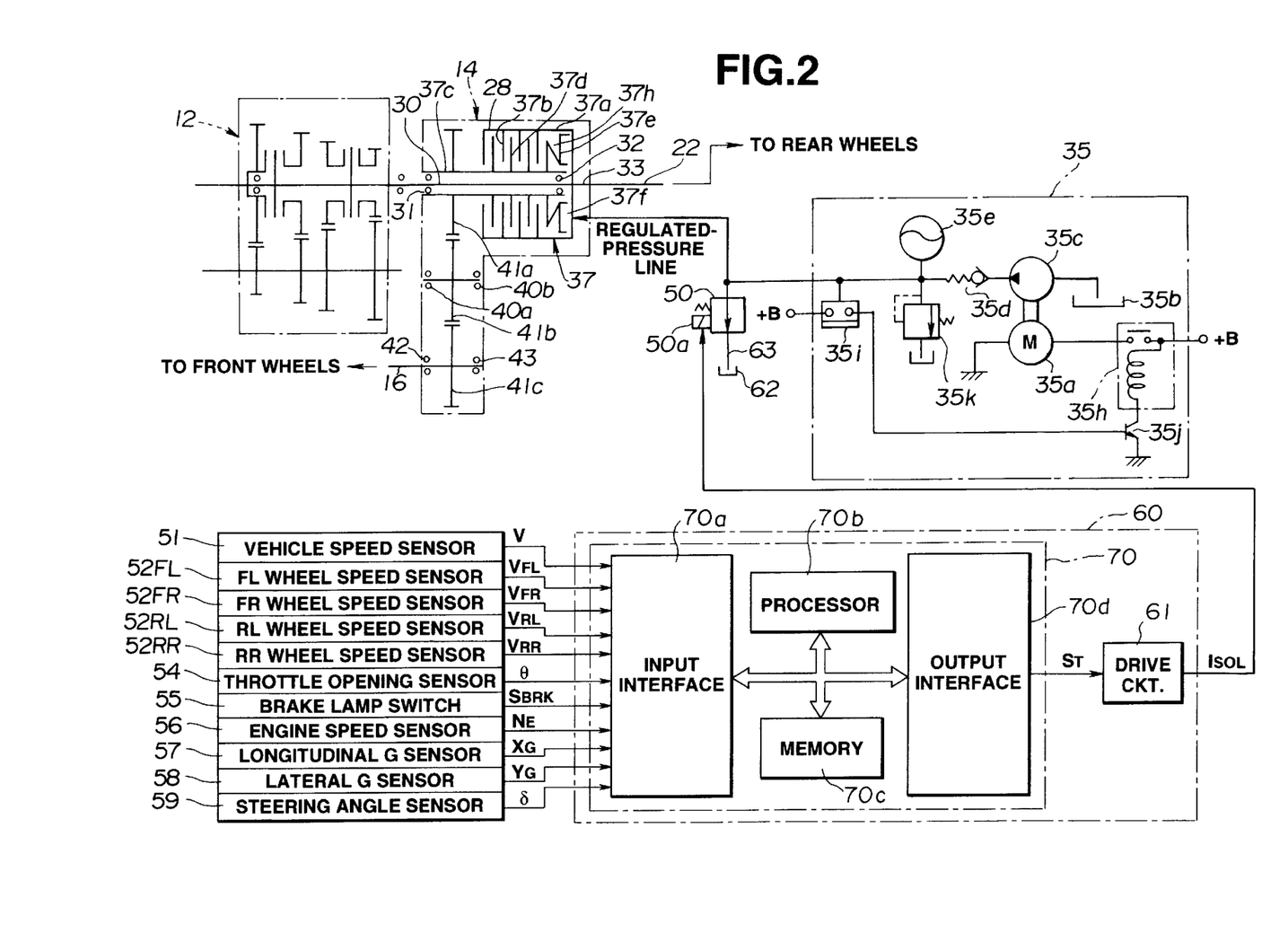
FIG. 2 is a block diagram illustrating details of the torque distribution control system shown in FIG. 1.

Referring now to FIG. 2, there is shown a simple illustration of the transfer 14. The transfer 14 includes a transfer case 28 and an input shaft 30 connected to the transmission output shaft at its left-hand end and rotatably supported by radial bearings 31. The right-hand end of the input shaft 30 of the transfer is connected to a transfer output shaft 33 which is rotatably supported by way of radial bearings 32 connected to the rear propeller shaft 22 usually by a spline connection. Typical details of such a transfer are set forth, for example, in U.S. Pat. No. 4,966,249 assigned to the assignee of the present invention and issued Oct. 30, 1990 to Takashi Imaseki or in U.S. Pat. No. 4,757,870 issued Jul. 19, 1988 to Torni et al., the teachings of which are hereby incorporated by reference. As seen in FIG. 2, the transfer 14 includes a hydraulic-pressure operated multiple-disk clutch (a friction clutch) 37, often called a "transfer clutch", put in place on the transfer input shaft 30, for varying the torque distribution ratio of the portion of the torque delivered to the front wheels to the remaining portion of the torque delivered to the rear wheels by varying the engagement force of the friction clutch 37. The clutch 37 consists of a clutch drum 37a splined to the transfer input shaft 30, a set of friction plates (a set of driving clutch plates) 37b being splined to the clutch drum 37a, a clutch hub 37c rotatably supported on the input shaft 30 by means of needle bearings, the other set of driven clutch plates 37d being splined to the clutch hub 37c, an essentially annular clutch piston 37e, and a cylindrical servo chamber 37f defined between the inner wall of the clutch drum 37a and the clutch piston 37e. Reference sign 37h denotes a return spring for biasing the servo piston 37e to the spring-loaded position namely the rightmost position (viewing FIG. 2). The servo piston 37e axially moves leftwards against the bias of the spring 37h when hydraulic pressure is applied behind the piston via the oil line fluidly connected between the servo chamber 37f of the transfer and a pressure control valve unit 50 included in the control system 4 which will be fully described later. The leftward movement of the servo piston 37e causes the clutch friction plates to be forced together so that the transfer clutch 37 is engaged with the clutch drum 37a and the clutch hub 37c in engagement with each other. The engagement force of the clutch 37 is essentially proportional to the hydraulic pressure applied behind the piston 37e. This type of transfer clutch (friction clutch) is often called a "variable-torque friction clutch". For the purpose of delivering a portion of the torque to the front wheel side, the clutch hub 37c is splined to the first gear 41a. The first gear 41a is in meshed-engagement with the second gear 41b being rotatably supported by means of radial bearings 40a and 40b. The second gear 41b is in meshed-engagement with the third gear 41c being rotatably supported by means of radial bearings 42 and 43. Usually, the transfer 14 is designed to deliver almost half the torque transmitted from the transmission to the transfer through the gear train composed of the gears 41a, 41b and 41c via the front propeller shaft 16 toward the front wheels, when the transfer clutch 37 is fully engaged under pressure. When there is no hydraulic pressure applied to the piston via the port of the transfer, the pressure within the servo chamber 37f is held at a pressure level substantially equal to an atmospheric pressure, thus permitting the first set of clutch plates 37b to disengage from the second set of clutch plates 37d by the bias of the spring 37h. Under this condition, the torque transmitted to the transfer input shaft 30 is all delivered through the transfer output shaft 33 and the rear propeller shaft 22 toward the rear wheels, and thus the vehicle is in the rear-wheel-drive state. As the hydraulic pressure applied behind the piston 37e increases, the clutch plates 37b and 37d are engaged more tightly. In other words, as the pressure (denoted by P) applied to the piston 37e increases, the engagement force of the transfer clutch 37 increases proportionally. The engagement force of the clutch correlates with the torque distribution ratio of the torque delivered to the front wheels to the torque delivered to the rear wheels. Therefore, the torque (denoted by $\Delta T$) delivered to the front wheels, which torque $\Delta T$ may increases essentially in a linear fashion with respect to the increase in the pressure P applied behind the servo piston 37e, can be represented by the following expression (1).

$$\Delta T = P.S.2n.\mu.r_m \tag{1}$$

where S denotes a surface area of a pressure receiving surface of the piston 37e, n denotes the number of the clutch plates 37d, $\mu$ denotes a friction coefficient of the clutch plates, and rm denotes a torque-transmission effective radius.

In the shown embodiment, the hydraulic pressure applied behind the piston 37e is the atmospheric pressure, there is no delivery of torque towards the front wheels, and thus the front-and-rear wheel torque distribution ratio is maintained at 0:100. In contrast, when the pressure behind the piston 37e is held above a high pressure level near the maximum hydraulic pressure which can be produced by the pressure control valve unit 50 as detailed later, the piston 37e moves to the leftmost position and thus the clutch 37 is fully engaged so that the torque distribution ratio is maintained at 50:50.

Returning to FIG. 1, the torque distribution control system 4 includes the previously-discussed transfer 14, the hydraulic pressure source 35 for producing a pressurized hydraulic fluid or a pressurized working fluid, and the pressure control valve unit 50 comprising a proportional electromagnetic type pressure reducing valve. The control system 4 also includes a controller (or a control unit) 60 receiving from signals from various sensing devices, namely a vehicle speed sensing device 51, front-left, front-right, rear-left and rear-right wheel speed sensing devices 52FL, 52FR, 52RL and 52RR, a throttle-opening sensing device 54, a brake lamp switch 55, an engine speed sensing device 56, a longitudinal acceleration sensing device 57, a lateral acceleration sensing device 58 and a steering angle sensing device 59. The vehicle speed sensing device 51 is provided for detecting a vehicle speed in the longitudinal direction of the vehicle to generate a vehicle-speed indicative data V. The wheel speed sensing devices 52FL through 52RR are actually comprised of four wheel speed sensors respectively located at the front-left, front-right, rear-left and rear-right wheels 2FL–2RR, to feed wheel-speed indicative data $V_{FL}$, $V_{FR}$, $V_{RL}$ and $V_{RR}$ to the input interface circuit 70a of a microcomputer 70 which will be hereinafter described in detail. The throttle-opening sensing device 54 is provided for monitoring an opening of the throttle valve (simply a throttle opening) by detecting the amount of depression of the accelerator pedal (not shown) or by detecting the angular position of the throttle, and for outputting a throttle-opening indicative signal θ. Usually, a throttle position sensor (simply a throttle positioner) is used as the throttle-opening sensing device 54. The throttle-opening sensing device 54 generates a signal indicative of a throttle opening of 0% when there is no depression of the accelerator pedal. When the amount of depression of the accelerator pedal reaches the maximum value, the throttle-opening sensing device 54 generates a signal indicative of a throttle opening of 100%. That is to say, as the amount of depression of the accelerator pedal increases, a value of the signal θ from the throttle-opening sensing device 54 increases proportionally. The brake lamp switch (or a stop lamp switch) 55 is provided near the brake pedal (not shown). In a conventional manner, the brake lamp switch 55 is operated in response to depression of the brake pedal. When the brakes are released, electric contacts of the brake lamp switch remain opened, and thus a signal $S_{BRK}$ from the brake lamp switch is maintained at a low signal level (a switched-OFF signal or a logical value "0"). With the brake pedal depressed, a signal $S_{BRK}$ from the switch is maintained at a high signal level (a switched-ON signal or a logical value "1"). The engine speed sensing device 56 is provided for detecting an engine speed $N_E$. Each of the previously-noted speed sensing devices 52FL through 52RR is conventionally comprised of a magnetic pickup type speed sensor consisting of a coil, a magnet located within the coil, a soft iron bar, and a toothed sensor rotor located in place at the associated road wheel. As the road wheel rotates, the toothed sensor rotor produces changes in magnetic flux, thus creating a sinusoidal-wave voltage signal (ac voltage signal)in the coil. The wheel-speed indicative voltage signal $V_{FL}$, $V_{FR}$, $V_{RL}$ and $V_{RR}$ is fed to the input interface 70a of the microcomputer. Alternatively, the magnetic pickup type wheel-speed sensor may be replaced with an optical type pickup. The engine speed sensor 56 generally monitors the engine revolution speed $N_E$ by detecting pulses created by the ignition coil of the engine. The longitudinal acceleration sensing device 57 generates a longitudinal acceleration indicative signal $X_G$ in the form of a positive voltage signal in response to the magnitude of an acceleration or deceleration exerted on the vehicle in the longitudinal direction. The lateral acceleration sensing device 58 generates a lateral acceleration indicative signal $Y_G$ in the form of a positive voltage signal in response to the magnitude of a lateral acceleration exerted on the vehicle in the lateral direction, when the vehicle turns to the left or the right. The steering angle sensing device 59 generates a steering angle indicative signal δ in the form of a voltage signal in response to the magnitude of the steering angle of the steering wheel. As shown in FIG. 2, the fluid pressure source 35 includes an electric motor 35a, an oil reservoir 35b, and an oil pump 35c being driven by the motor 35a. The pump 35c draws hydraulic oil from the reservoir 35b and producing a pressurized working fluid. The pressure source 35 also includes a one-way check valve 35d fluidly disposed between the control valve unit 50 and the outlet port (or discharge port) of the pump 35c, and a pressure accumulator 35e fluidly connected to the connection line (corresponding to a working-fluid pressure supply line) interconnecting the check valve 35d and the control valve unit 50. A relief valve 35k is also connected to the connection point between the pressure accumulator 35e and the check valve 35d, for maintaining a line pressure within the pressure supply line at a predetermined set pressure. One end of the motor wire of the electric motor 35a is electrically connected to the positive battery terminal (+B) via a motor relay 35h, while the other end is grounded. Reference sign 35i denotes a pressure switch for detecting a line pressure in the pressure supply line connecting the pressure accumulator 35e and the pressure control valve unit 50. As is generally known, the pressure switch 35i operates in response to the line pressure so that the pressure switch is switched OFF when the line pressure detected exceeds a predetermined pressure level (the predetermined set line pressure). Also provided is a npn transistor 35j serving as a switching regulator which properly energizes or de-energizes the motor 35a in response to the signal from the pressure switch 35i. The arrangement of the motor control circuitry is clearly shown in the right-hand side of FIG. 2. The base of the transistor 35j is connected to the positive battery terminal (+B) through the pressure switch 35i, whereas the emitter is grounded. The collector of the transistor 35j is connected to the positive battery terminal (+B) through the relay coil of the motor relay 35h. With the previously-noted arrangement, when the line pressure in the pressure supply line becomes greater than the predetermined set pressure, the pressure switch is switched ON, with the result that the transistor 35j is turned OFF and thus the relay armature of the motor relay moves away from the relay contacts. As a result, the relay 35h is switched OFF and no exciting current flows across the motor winding. In this manner the pump 35c is stopped. Simultaneously with this, the relief valve 35k functions to relieve the working-fluid pressure above the set line pressure. On the contrary, in the event that the line pressure in the pressure supply line drops below the set line pressure, the transistor 35 is turned on with the pressure switch 35i switched ON. As a result, the exciting current flows across the relay coil, and then the relay armature is brought into contact with the two relay contacts. The motor relay 35h is switched on and thus the motor is energized so that the pump rotates and so that the line pressure rises up to the set line pressure. In this manner, the line pressure is stably supplied from the pressure source 35 to the primary pressure side of the pressure control valve unit 50. Actually, the line pressure fed to the primary pressure side of the valve unit 50 tends to fluctuate. The pressure control valve unit 50 is constructed by a so-called proportional electromagnetic type pressure reducing valve (or a proportional electromagnetic type pressure regulator valve) which is capable of producing a secondary pressure regulated essentially at a constant pressure level. The drain port of the control valve unit 50 is connected through a drain line 63 to an oil reservoir 62. The pressure control valve unit 50, constructed by the proportional electromagnetic type pressure reducing valve, is designed so that the axial position of the spool axially slidably disposed in the pressure reducing valve varies depending on the current value of a command current $I_{SOL}$ flowing through an electrically energized solenoid coil of an electric solenoid 50a incorporated in the proportional electromagnetic type pressure reducing valve. The axial position of the spool precisely correlates with the opening of the pressure reducing valve. In other words, the pressure reducing valve is responsive to the current value of the command current $I_{SOL}$ flowing through the solenoid 50a so that, irrespective of the presence or absence of pressure fluctuations in the primary pressure (the line pressure) fed into the inlet port of the pressure reducing valve, the regulated pressure Pc (the secondary pressure output from the pressure reducing valve) fed via the regulated-pressure line to the servo chamber 37f of the transfer clutch increases proportionally, as the current value of the command current $I_{SOL}$ increases. Typical details of such a construction of the proportional electromagnetic type pressure reducing valve (or pressure regulator valve), which is applicable to the pressure control valve unit 50 incorporated in the torque distribution control system 4, are set forth, for example, in U.S. Pat. No. 5,501,311 assigned to the assignee of the present invention and issued Mar. 26, 1996 to Tatsuo Wakahara or in U.S. Pat. No. 5,032,995 (corresponding to Japanese Patent Provisional Publication No. 2-68225) assigned to the assignee of the present invention and issued Jul. 16, 1991 to Toshiro Matsuda et al., the teachings of which are hereby incorporated by reference.

Figure 5:
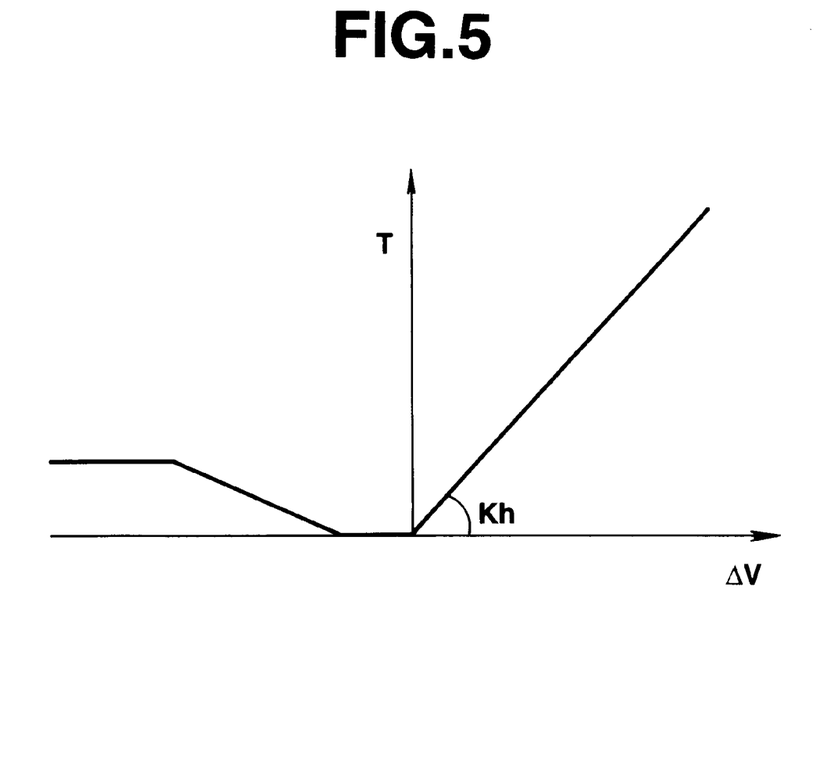
FIG. 5 is a look-up table showing a predetermined wheel-speed difference ($\Delta V$) versus torque (T) characteristic.
Figure 6:
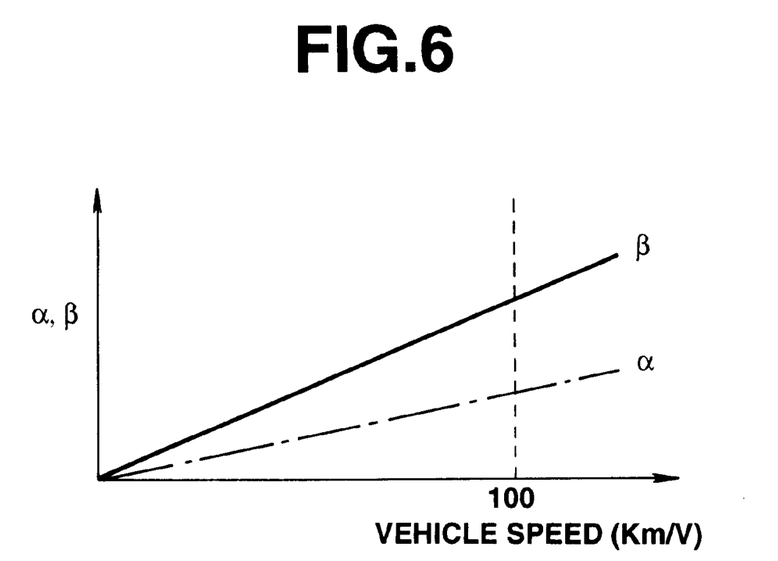
FIG. 6 is a look-up table used to select a correction value ($\alpha$ or $\Delta$) depending on the wheel-speed difference ($\Delta V$)

The controller 60 comprises the microcomputer 70 and the solenoid drive circuit 61. The drive circuit 61 is electrically connected to the solenoid 50a of the pressure control unit 50 consisting of the proportional electromagnetic pressure reducing valve, for sending the command current $I_{SOL}$ to the solenoid 50a to energize the same. The microcomputer 70 includes an input interface circuit (or an input interface) 70a serving as an analog-to-digital converter, a processor 70b for performing sub-routines shown in FIGS. 3 and 4, a memory 70c usually composed of a read only memory (ROM) and a random access memory (RAM), and an output interface circuit (or an output interface) 70d. As seen in FIG. 2, the processor 70b and the memory 70c are mutually connected to each other for automatic transmission and reception of information. The memory 70c memorizes the data maps as illustrated in FIGS. 5 and 6. These data map (or the look-up tables) are used in the routines shown in FIGS. 3 and 4. The output interface circuit 70d serving as a digital-to-analog converter for generating a clutch-engagement-force indicative control signal $S_T$ based on the solenoid command current $I_{SOL}$ which is obtained through the arithmetic processing of FIG. 3. The data map shown in FIG. 5 shows only one example of the front-and-rear wheel speed difference ($\Delta V$) versus clutch-engagement force (T) characteristic. The characteristic may be properly varied depending on sizes and types of the vehicle. Briefly speaking, the processor 70b of the microcomputer discriminates whether fluctuations in the clutch-engagement force T occur owing to installation of a tire of an outside diameter different from the other tires, when satisfying predetermined conditions (a predetermined running state) suitable to detect the front-and-rear wheel-speed difference $\Delta V$ resulting from the difference between outside diameters of tires installed on the four road wheels 2FL through 2RR. The tire of an outside diameter different from the other tires will be herebelow referred to as a "different-diameter tire". When the processor determines that the fluctuations in the clutch engagement force T takes place owing to the installation of the different-diameter tire, the front-and-rear wheel-speed difference $\Delta V$, which occurs due to the installation of the different-diameter tire such as a so-called temper tire, is properly corrected as a corrected wheel-sped difference $\Delta V'$ by the correction value $\alpha$ or $\beta$ as indicated in FIG. 6. The correction procedures correspond to the flow from step S3 through step S4 to steps S5 and S6 or to steps S8 and S9. The processor 70b computes the clutch engagement force T on the basis of the corrected wheel-speed difference $\Delta V'$ and then the output interface circuit 70d outputs the clutch-engagement-force control signal $S_T$ based on the computed data T to the solenoid drive circuit 61. For example, the solenoid drive circuit 61 may be comprised of a floating type voltage stabilizer serving to convert the control signal $S_T$ from the output interface circuit 70d to the command current $I_{SOL}$ for the electric solenoid 50a. Generally, the wheel-speed difference $\Delta V$, which occurs due to the installation of the different-diameter tire, tends to increase almost proportionally as the vehicle speed V increases. For this reason, as seen in FIG. 6, the correction values $\alpha$ and $\beta$ are set so that these correction values $\alpha$ and $\beta$ increase in proportion to the increase in the vehicle speed V.

Figure 3:
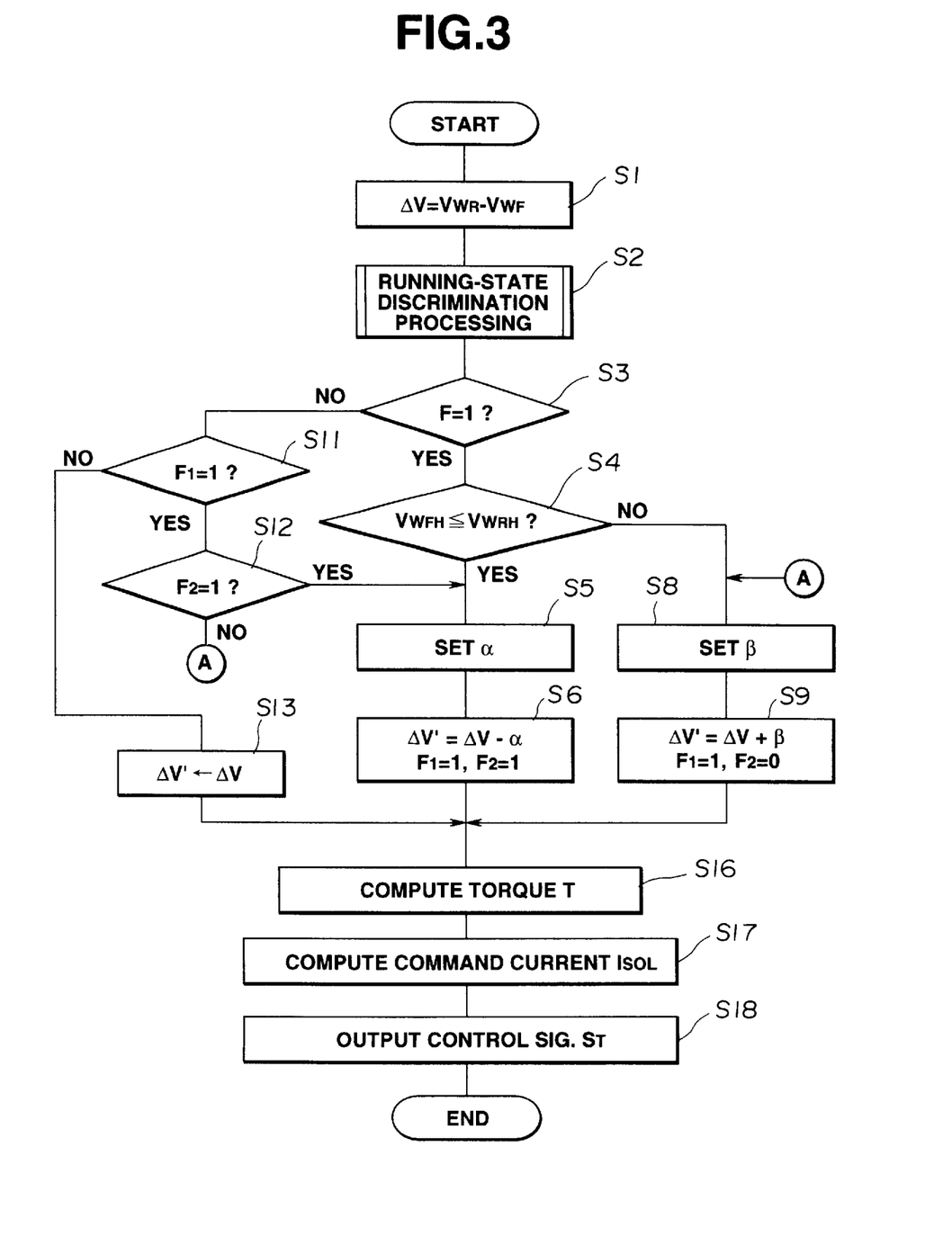
FIG. 3 is a flow chart illustrating one example of a sub-routine (an arithmetic processing) executed by a microcomputer employed in the controller shown in FIG. 2.
Figure 4:
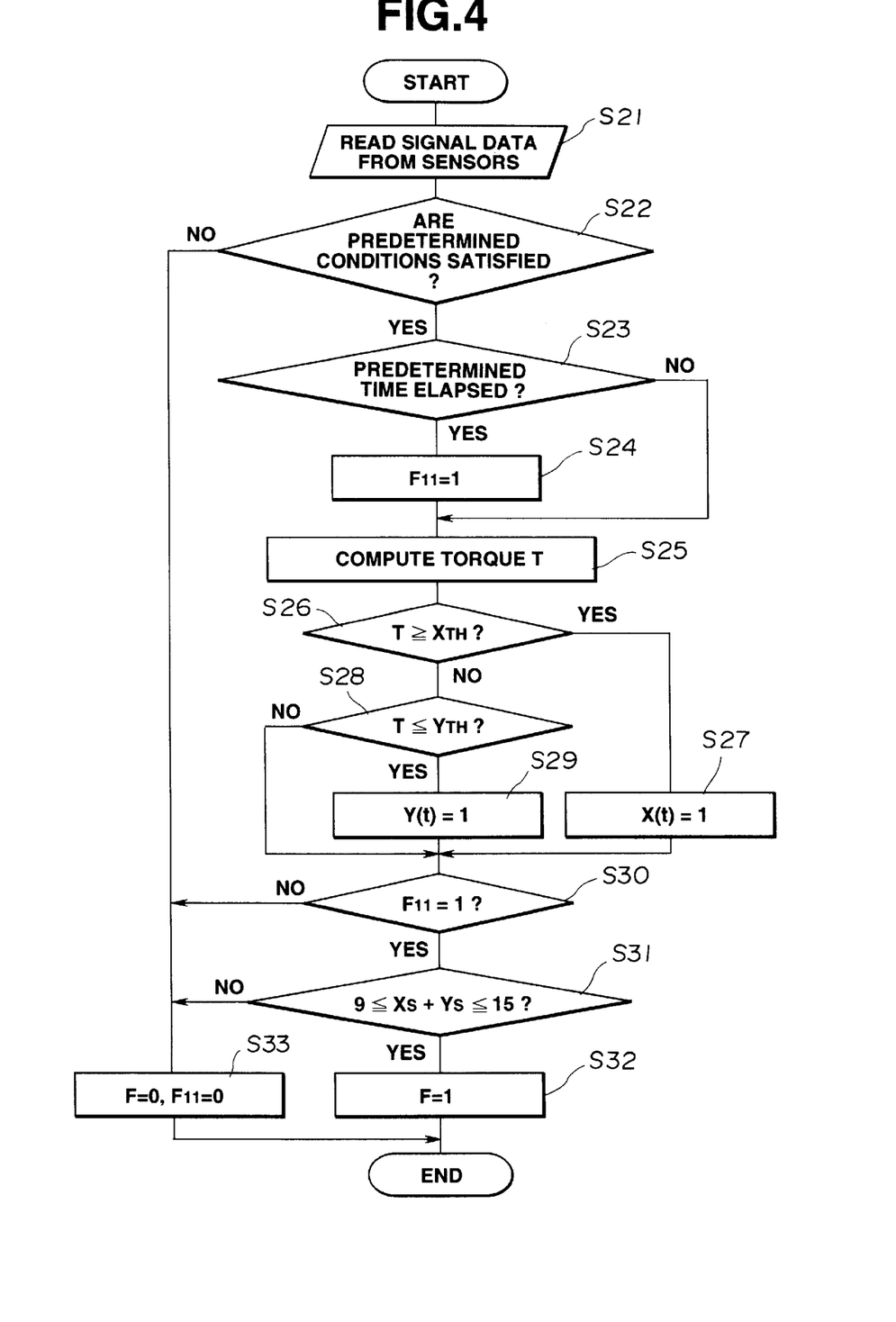
FIG. 4 shows a flow chart illustrating one example of a running-state discrimination processing performed at step S2 of the routine shown in FIG. 3.

Hereinafter described in detail in accordance with the flow charts shown in FIGS. 3 and 4 is the arithmetic processing executed by the processor 70b of the microcomputer 70.

The arithmetic processing or the sub-routine shown in FIGS. 3 and 4 is executed as time-triggered interrupt routines to be triggered every predetermined intervals such as 20 msec.

In step S1, first of all, wheel-speed indicative data $V_{FL}$, $V_{FR}$, $V_{RL}$ and $V_{RR}$ are read in. A mean front-wheel speed VWF is computed as a simple mean of the two wheel-speed indicative data $V_{FL}$ and $V_{FR}$, while a mean rear-wheel speed VWR is computed as a simple mean of the two wheel-speed indicative data $V_{RL}$ and $V_{RR}$. Then, a wheel-speed difference $\Delta V$ between rear- and front-wheel speeds is computed from the expression ($\Delta V$=VWR−VWF). Various data VWF, VWR, $\Delta V$ and the like, being obtained through the current interrupt routine, are temporarily stored in the memory 70c. For example, data VWF, VWR, $\Delta V$, being obtained through the interruptions which take place for a predetermined period of time (such as 3 seconds), are updated every predetermined sampling time intervals such as 20 msec.

In step S2, the processor 70b of the microcomputer discriminates whether or not the vehicle is in a specified running state in which wheel-speed data, precisely reflecting only the difference between the outside diameters of the four tires, are detectable, that is the wheel-speed difference $\Delta V$ resulting from only the difference of the outside diameters of the tires is detectable precisely. The specified running state will be hereinafter referred to as a "different-diameter-tire dependent wheel-speed difference detectable state". The discrimination processing of the running state is actually performed in accordance with the sub-routine shown in FIG. 4.

Referring to FIG. 4, the sub-routine of FIG. 4 is hereinbelow described in detail.

In step S21, read are signal data from the sensors 51 through 59. Then, in step S22, a test is made to determine whether or not predetermined conditions are satisfied. These predetermined conditions correspond to necessary conditions required to discriminate whether the vehicle is in the previously-noted different-diameter-tire dependent wheel-speed difference detectable state. In the shown embodiment, the following three conditions are used as the necessary conditions. First, the vehicle-speed indicative data V from the vehicle speed sensing device 51 is above a predetermined value for example 60 km/h. The first necessary condition means that the vehicle speed is above a predetermined speed such as 60 km/h. Second, positive and negative fluctuations or variations in the vehicle-speed indicative data V are within a predetermined range of fluctuations for example ±5 km/h, the throttle-opening indicative signal $\theta$ from the throttle-opening sensing device 54 is within a predetermined throttle opening for example 5%, positive and negative fluctuations or variations in the engine-speed indicative data $N_E$ from the engine speed sensing device 56 are within a predetermined range of fluctuations for example ±300 rpm, the longitudinal-acceleration indicative signal data $X_G$ from the longitudinal acceleration sensing device 57 is within a predetermined range of |0.1 G |, and the signal $S_{BRK}$ from the brake lamp switch 55 is maintained at a logical value "0" (or a zero signal level). The second necessary condition means that the vehicle is traveling at a constant speed. Third, the lateral-acceleration indicative signal data $Y_G$ from the lateral acceleration sensing device 58 is within a predetermined range of |0.1 G |, and positive and negative fluctuations or variations in the steering angle indicative signal δ from the steering angle sensing device 59 are within a predetermined range of fluctuations for example ±3 degrees with respect to the neutral position (the zero steering angle) of the wheel steering. That is, the third necessary condition means that the vehicle is not A making a turn to the left or to the right. When the first, second and third necessary conditions are all satisfied, step S23 proceeds. On the basis of the results being obtained at step S22 through the interruptions of FIG. 4 continuously executed every predetermined intervals for a predetermined time period such as 3 seconds, in step S23 a test is made to determine whether the first, second and third necessary conditions have been all satisfied for the predetermined time period for example 3 seconds. When the answer to step S23 is affirmative (YES), step S24 enters in which a flag $F_{11}$ is set at "1". The flag $F_{11}$ set at "1" means that the all of the first, second and third necessary conditions have been satisfied continuously for the predetermined time period. Then, step S25 proceeds in which the clutch engagement force T is derived on the basis of the wheel-speed difference ΔV (computed through step S1 of FIG. 3) between the rear- and front-wheel speeds, by reference to the look-up table shown in FIG. 5. As may be appreciated, as the clutch engagement force T increases, the torque ΔT delivered via the front axle driveshafts 20 to the front wheels 2FL and 2FR tends to increase proportionally. Thus, the clutch engagement force T can be regarded as being equivalent to the torque ΔT delivered to the front wheels When the answer to step S23 is negative (NO), the procedure flows from step S23 to step S25 without setting the flag $F_{11}$. The characteristic shown in the data map of FIG. 5 is based on the reasons set out below. Assuming that the difference ΔV is a positive value, the vehicle may experience a rear-wheel slip or drive-wheel slip (often called "acceleration slip") with the rear drive wheels rotating higher than the vehicle speed, owing to the lowering of the friction coefficient μ of the road surface or to hard acceleration of the vehicle. In order to prevent the so-called acceleration slip at the drive wheels, and consequently to improve the steer characteristics and the driving stability, the clutch engagement force T (the torque ΔT delivered to the front wheels) increases at a predetermined control gain (a proportional gain) Kh proportionally, as the wheel-speed difference ΔV (of a positive value) increases. In the data map of FIG. 5, although the control gain Kh is discussed as the proportional gain, the control gain Kh may be varied depending upon variations in the mean front-wheel speed indicative data VwF. For instance, in order to enhance the starting performance of the vehicle, it is preferable to gradually decrease the control gain Kh in accordance with the increase in the front-wheel speed indicative data VwF. In contrast with this, when the difference ΔV is a negative value, the rear-wheel skid (or the rear-wheel lock) may take place with the rear wheels locked or the rear-wheel skid may start to develop with the rear wheels rotating lower than the vehicle speed, owing to the increase in braking force created by an engine braking action or an excessive braking action of the rear wheel-brake cylinder, on low-μ roads. Also, the rear-wheel lock tends to occur in the case that the vehicle is rounding a curve with the road wheels turning on comparatively small radii on high-μ roads. In such a case, the front wheels turning on comparatively greater turning radii tend to rotate faster than the rear wheels turning on comparatively smaller turning radii owing to the difference in wheel travel between inner and outer wheels. Thus, in order to reduce the steering effort or to enhance the steering performance, or to improve the steer characteristics and to enhance the driving stability, the clutch engagement force T (the torque ΔT delivered to the front wheels) tends to increase, as the absolute value |ΔV| of the negative wheel-speed difference data ΔV increases. Additionally, in the case that the negative wheel-speed difference ΔV is within a predetermined range (called a "dead band") defined between zero and a predetermined small negative value, the clutch engagement force T or the torque ΔT is set at zero. One advantage of the provision of the dead band is that the delivery of undesired excessive torque to the front wheels is prevented when there is a decreased tendency for rear-wheel lock to occur. As is generally known, the less the turning radius of the road wheel on turns, the greater the difference in wheel travel between inner and outer wheels. Thus, in the event that the torque delivered to the front wheels 2FL and 2FR is increased unintendedly when the right-angle turn or left-angle turn is made with road wheels turning on comparatively small radii at a relatively low speed, there results in a considerably great wheel-speed difference ΔV (of a negative value) between the rear- and front-wheel speeds. This produces a so-called tight-corner braking phenomenon. The other advantage of the provision of the previously-noted dead band is to prevent the undesired tight-corner braking phenomenon which may take place when the vehicle is making a turn with the road wheels turning on comparatively small radii at low speeds. When the absolute value |ΔV | of the wheel-speed difference Δ V exceeds a predetermined threshold, the clutch engagement force T (i.e., the torque ΔT) is maintained at a predetermined constant value at which the torque distribution ratio of the torque delivered to the front wheels to the torque delivered to the rear wheels is held substantially at a ratio of 25:75. As set forth above, the wheel-speed difference (ΔV) versus clutch engagement force (T) characteristic shown in FIG. 5 is advantageous to enhancement of the driving stability. Returning to the flow chart of FIG. 4, the procedure advances from step S25 to step S26 in which a test is made to determine whether the torque T, being computed on the basis of the wheel-speed difference data ΔV, retrieving the data map of FIG. 5, exceeds a predetermined upper threshold $X_{TH}$. When the answer to step S26 is affirmative, i.e., in case of $T \geq X_{TH}$, step S27 enters in which an upper-limit count data X(t) is set at a logical value "1", and then the signal indicative of the count data X(t) of a logical value "1" is output to a predetermined address of the memory 70c. Then step S30 proceeds in which a test is made to determine whether the flag $F_{11}$ is set or reset. Conversely, when the answer to step S26 is negative, i.e., in case of $T < X_{TH}$, step S28 enters in which a test is made to determine whether the torque T is below a predetermined lower threshold $Y_{TH}$. When the answer to step S28 is affirmative, i.e., in case of $T \leq Y_{TH}$, step S29 enters in which a lower-limit count data Y(t) is set at a logical value "1", and then the signal indicative of the count data Y(t) of a logical value "1" is output to a predetermined address of the memory 70c. In contrast, when the answer to step S28 is negative, i.e., in case of $T > Y_{TH}$, the procedure flows to step S30. The signal data indicative of the upper-limit count data X(t) of a logical value "1" and the signal data indicative of the lower-limit count data Y(t) of a logical value "1", being obtained through the interruptions which take place for a predetermined time period such as 3 seconds, are updated in the predetermined memory addresses every predetermined sampling time intervals such as 20 msec. As appreciated, it is possible to compute the number Xs of outputs of the upper-limit count data X(t) of a logical value "1" and to compute the number Ys of outputs of the lower-limit count data Y(t) of a logical value "1", from the updated signal data stored in the memory addresses. The number Xs of the outputs of the upper-limit count data X(t) of "1" means how many times each of the computed clutch-engagement-force indicative data T, being obtained through the interrupt routines repeatedly executed, exceeds the predetermined upper threshold $X_{TH}$ for the predetermined time period such as 3 seconds. On the other hand, the number Ys of the outputs of the lower-limit count data Y(t) of "1" means how many times each of the computed clutch-engagement-force indicative data T, being obtained through the interrupt routines repeatedly executed, becomes less than the predetermined lower threshold $Y_{TH}$ for the predetermined time period such as 3 seconds. When the answer to step S30 is affirmative, i.e., in case of $F_{11}=1$, that is, in the case that the previously-noted necessary conditions have been satisfied continuously for the predetermined time period, step S31 proceeds. In step S31, the sum (Xs+Ys) of the number Xs of the outputs of the upper-limit count data X(t) of "1" and the number Ys of the outputs of the lower-limit count data Y(t) of "1" is computed and then a test is made to determine whether the sum (Xs+Ys) is above a predetermined lower limit such as "9" and below a predetermined upper limit such as "15". In other words, the processor counts the first number Xs indicating how many times said engagement force exceeds the predetermined upper limit $X_{TH}$ for the predetermined period of time and simultaneously counts the second number Ys indicating how many times said engagement force becomes less than the predetermined lower limit $Y_{TH}$ for the predetermined period of time. The processor decides whether the oscillation-frequency of the fluctuations of the friction clutch is within the specified frequency range (3 to 5 Hz), by comparing a sum (Xs+Ys) of the first and second numbers with the predetermined first value (9) equivalent to a lower limit of said specified frequency range and with a predetermined second value (15) equivalent to an upper limit of said specified frequency range. The predetermined upper and lower limits are selected to specify frequencies of oscillation of the clutch engagement force T, which may occur due to a different-diameter tire installed at the vehicle. The predetermined upper and lower limits depend on the difference in the outside diameter between the tires installed on the vehicle. For instance, the oscillation frequencies of 3 to 5 Hz will generally take place when the vehicle is equipped with a so-called temper tire of a remarkably smaller outside diameter in comparison with the other tires of the usual size. Thus, when the temper tire is installed on the vehicle, the predetermined upper and lower limits are selected to be equivalent to a specified oscillation-frequency range of 3 to 5 Hz. In this manner, the predetermined upper and lower limits must be properly selected depending on specified oscillation frequencies which occurs due to the difference in the outside diameter between a different-diameter tire greater than or less than the usual size and the other tires of the usual size. These predetermined upper and lower limits, correlated with the specified oscillation-frequency of the engagement force T of the friction clutch when the different-diameter tire is installed at the vehicle, is pre-stored in the memory and timely retrieved at step S31.

For the reasons set out above, when the answer to step S31 is affirmative, i.e., in case of $9 \leq Xs+Ys \leq 15$, the processor of the microcomputer decides that the vehicle is in the previously-discussed different-diameter-tire dependent wheel-speed difference detectable state. The fourth condition defined by $9 \leq Xs+Ys \leq 15$ means that the torque $\Delta T$ which is delivered to the front wheels during the torque distribution control, fluctuates regularly within a specified oscillation-frequency range, precisely reflecting fluctuations in the clutch engagement force T which force may fluctuate due to the installation of the different-diameter tire on the vehicle. Therefore, the fourth condition as defined by $9 \leq Xs+Ys \leq 15$ will be hereinafter referred to as a "frequency condition". The procedure then flows from step S31 to step S32. That is, if the previously-noted first, second, third and fourth necessary conditions are all satisfied, step S32 proceeds in which a flag F is set at "1". Conversely, when the answer to step S31 is negative, i.e., in case of Xs+Ys<9 or Xs+Ys>15, step S33 enters in which the flag F is reset to "0" and the flag $F_{11}$ is reset to "0". When at least one of the first, Second and third conditions is not satisfied in step S22, the procedure jumps from step S22 to step S33. Also, in case of $F_{11}=0$ in step S30, the procedure jumps from step S30 to step S33.

Returning to the flow chart shown in FIG. 3, if the processor determines that the predetermined first, second, third and fourth conditions are all satisfied through the running-state discriminating processing of FIG. 4 and the flag F has been set, the procedure advances from step S3 to step S4. In step S4, a simple time-averaged front-wheel speed VWFH and a simple time-averaged rear-wheel speed VWRH are computed on the basis of the mean front-wheel speed indicative data set VWF and the mean rear-wheel speed indicative data set VWR being obtained at step S1 through the interruption routines of FIG. 3 continuously executed every predetermined intervals for a predetermined time period such as 3 seconds and stored temporarily in predetermined memory addresses of the memory 70c. Then the simple time-averaged front-wheel speed VWFH is compared with the simple time-averaged rear-wheel speed VWRH. In step S4, when the simple time-averaged rear-wheel speed VWRH is above the simple time-averaged rear-wheel speed VWFH, i.e., in case of VWFH≦VWRH, step S5 proceeds in which the correction value a is derived from the vehicle-speed indicative data V from the wheel-speed sensing device 51, retrieving the look-up table of FIG. 6. Then, in step S6, the corrected wheel-speed difference $\Delta V'$ is computed as a difference ($\Delta V - \alpha$) being obtained by subtracting the correction value $\alpha$ from the wheel-speed difference $\Delta V$ (see step S1). At the same time, a flag $F_1$ is set and a flag $F_2$ is set. The flag $F_1$ signals whether the comparison operation between the simple time-averaged rear-wheel speed VWRH and the simple time-averaged front-wheel speed VWFH has been made. On the other hand, the flag $F_2$ signals the magnitude relationship between the simple time-averaged rear-wheel speed VWRH and the simple time-averaged front-wheel speed VWFH. The condition of "$F_1=1$" means that the previously-described comparison between the two wheel speeds VWRH and VWFH has been already made. The condition of "$F_1=0$" means that the comparison operation of the two wheel speeds VWRH and VWFH has been not yet made. The condition of "$F_2=1$" means that the condition of VWFH≦VWRH is satisfied, i.e., the simple time-averaged rear-wheel speed VWRH is above the simple time-averaged front-wheel speed $V_{WFH}$. In contrast to the above, the condition of "$F_2=0$" means that the condition of $V_{WFH} > V_{WRH}$ is satisfied, i.e., the simple time-averaged front-wheel speed $V_{WFH}$ is above the simple time-averaged rear-wheel speed $V_{WRH}$.

In step S4, when the condition of $V_{WFH} > V_{WRH}$ is satisfied, step S8 enters in which the correction value β is derived from the vehicle-speed indicative data V, retrieving the look-up table of FIG. 6, and thereafter in step S9 the corrected wheel-speed difference ΔV' is computed as a difference (ΔV+β) being obtained by adding the correction value β to the wheel-speed difference ΔV (computed at step S1). At the same time, the flag $F_1$ is set and the flag $F_2$ is reset. Suppose that the different-diameter tire is installed at the rear end of the vehicle. In this case, the simple time-averaged rear-wheel speed $V_{WRH}$ tends to be greater than the simple time-averaged front-wheel speed $V_{WFH}$, owing to the different-diameter tire (fitted to the rear wheel) of an outside diameter smaller than the other tires of the usual size. Therefore, as soon as the processor decides that the vehicle is in the previously-discussed different-diameter-tire dependent wheel-speed difference detectable state, the processor compensates for the wheel-speed difference data ΔV through the operation of subtraction (ΔV−α) according to the flow from step S3 through steps S4 and S5 to step S6. In contrast, suppose that the different-diameter tire is installed at the front end of the vehicle. In this case, the simple time-averaged front-wheel speed $V_{WFH}$ tends to be greater than the simple time-averaged rear-wheel speed $V_{WRH}$, owing to the different-diameter tire (fitted to the front wheel) of an outside diameter smaller than the other tires of the usual size. Therefore, as soon as the processor decides that the vehicle is in the previously-discussed different-diameter-tire dependent wheel-speed difference detectable state, the processor compensates for the wheel-speed difference data ΔV through the operation of addition (ΔV+β) according to the flow from step S3 through steps S4 and S8 to step S9.

Returning to step S3, when the flag F is reset, step S11 proceeds in which a test is made to determine whether the flag $F_1$ is set or reset. In case of $F_1=1$, the procedure flows from step S11 to step S12 in which a test is made to determine whether the flag $F_2$ is set or reset. When the answer to step S12 is affirmative ($F_2=1$), the procedure flows from step S12 to step S5. Conversely, when the answer to step S12 is negative ($F_2=0$), the procedure flows from step S12 to step S8. When the answer to step S11 is negative, i.e., in case of $F_1=0$, the procedure flows from step S11 to step S13 in which the wheel-speed difference ΔV is regarded as the corrected wheel-speed difference ΔV'. That is, the wheel-speed difference ΔV is set to the corrected wheel-speed difference ΔV' through step S13. After compensation for the wheel-speed difference ΔV through steps S6, S9 or S13, step S16 enters in which the clutch engagement force T of the transfer clutch is computed from the corrected wheel-speed difference ΔV', retrieving the look-up table shown in FIG. 5. Then, in step S17, the processor computes and determines the current value of the command current $I_{SOL}$ to be applied to the solenoid 50a of the pressure control valve unit 50, from the clutch engagement force T computed at step S16. Then, in step S18, the controller 60 outputs the clutch-engagement-force indicative control signal $S_T$ based on the computed current value of the solenoid command current $I_{SOL}$ through the output interface circuit 70d to the solenoid drive circuit 61. In this manner, a series of torque distribution control procedures end. Thereafter, the solenoid drive circuit 61 converts the control signal $S_T$ to the solenoid command current $I_{SOL}$. The command signal $I_{SOL}$ is applied to the solenoid 50a, with the result that the spool, which is slidably enclosed in the pressure reducing valve constructing the pressure control valve unit 50, is shifted to a desired position to set the opening of the spool valve to a desired opening. With the spool valve of the pressure control valve unit maintained at the desired opening, the valve unit 50 outputs the regulated pressure Pc (based on the computed current value of the solenoid command current $I_{SOL}$) via the regulated-pressure line to the servo chamber 37f of the transfer clutch. Thus, the torque control system of the embodiment can provide a satisfactory torque distribution control even through the vehicle is equipped with a different-diameter tire of an outside diameter at either one of the front and rear ends of the vehicle. As can be appreciated, the previously-discussed steps S26 through S31 are provided to precisely discriminate whether or not the cause of torque fluctuations of the torque delivered to the front wheels results from a different-diameter tire installed at the vehicle. The previously-discussed steps S4, S5, S6, S8, S9, S11 and S12 are provided to properly compensate for the wheel-speed difference data ΔV in due consideration of the difference in the front- and rear-wheel speeds, resulting from only the different-diameter tire installed at the vehicle.

Assuming that the previously-described first, second and third necessary conditions are all satisfied for the predetermined time period such as 3 seconds, during constant-speed, straight-ahead driving at a constant speed of 60 km/h or more on so-called high-μ flat roads, the system of the embodiment operates as follows.

When the interrupt routine shown in FIG. 4 is executed, the procedure flows from step S21 through steps S22, S23 and S24 to step S25. At step S25, the clutch engagement force T is computed on the basis of the wheel-speed difference data ΔV (computed from the wheel-speed indicative data $V_{FL}$, $V_{FR}$, $V_{RL}$ and $V_{RR}$ read through step S21), by reference to the look-up table of FIG. 5. Suppose that a comparatively smaller diameter tire such as a so-called temper tire is installed at the rear end of the vehicle. The mean rear-wheel speed $V_{WR}$ becomes greater than the mean front-wheel speed $V_{WF}$ owing to the difference in the outside diameter between the front and rear wheels, thus resulting in the positive wheel-speed difference data (ΔV >0). Under these conditions, the positive wheel-speed difference ΔV exists, although actually there is no acceleration-slip at the rear wheels (no rear wheel spin). First, the delivery of the torque toward the front wheels is made in response to the clutch engagement force T based on the positive wheel-speed difference ΔV which is created by the different-diameter tire installed at the rear end of the vehicle. Then, the front wheels begin to slip owing to such improper torque delivery to the less-slipping greater traction front wheels, and as a result the wheel-speed data ΔV drops to almost zero. Therefore, the torque delivery toward the front wheels is stopped again. As a consequence, the stopping operation of the torque delivery toward the front wheels and the restarting operation of the torque delivery toward the front wheels are repeatedly interchanged for a while. The repetitions of the stopping and restarting operations of the torque delivery toward the front wheels may result in fluctuations in the clutch engagement force T, (torque fluctuations in the torque ΔT delivered to the front wheels). In other words, for a while (for a few minutes) from the beginning of a series of torque distribution control procedures as shown in FIGS. 3 and 4, undesirable hunting (undesired oscillation of the clutch engagement force T) takes place due to the different-diameter tire installed at the rear end of the vehicle. Assuming that the so-called temper tire is installed at the rear end of the vehicle, the frequency of the undesirable hunting may be within a specified frequency range of 3–5 Hz. Thereafter, the frequency (corresponding to Xs+Ys) of the clutch engagement force T, being obtained through several interruptions (several interrupt routines) continuously executed for a predetermined time period such as 3 seconds, is compared with the frequency condition (the fourth condition defined by $9 \leq Xs+Ys \leq 15$). For instance, in four-wheel-drive vehicles being equipped with a temper tire, the lower limit of the sum (Xs+Ys) of the number of the outputs of the count data X(t) and Y(t) is preset to "9" equivalent to a minimum frequency 3 Hz, whereas the upper limit of the sum (Xs+Ys) of the number of the outputs of the count data X(t) and Y(t) is preset to "15" equivalent to a maximum frequency 5 Hz. Thus, in case of such a four-wheel-drive vehicle equipped with the so-called temper tire, the frequency condition ($9 \leq Xs+Ys \leq 15$) is satisfied. Accordingly, the system decides that the previously-described first, second, third and fourth conditions are all satisfied, and thus the flag F is set. As appreciated from the flow chart shown in FIG. 3, the procedure flows from step S3 through steps S4 and S5 and then to S6. In step S6, for the purpose of compensation for the positive wheel-speed difference $\Delta V$, occurring due to the different-diameter tire installed at the rear end of the car, the operation of subtraction ($\Delta V - \alpha$) is executed so that the corrected wheel-speed difference $\Delta V'$ becomes almost zero. Necessarily, the clutch engagement force T based on the corrected wheel-speed difference $\Delta V'$ becomes almost zero, and as a result there is less delivery of torque toward the front wheels. Therefore, the vehicle begins to travel in the two-wheel-drive mode without any torque fluctuations (undesired hunting) from the end of a series of torque distribution control procedures. After this, the drive mode of the vehicle is kept at the two-wheel-drive mode in accordance with the same control procedures as set forth above, while the above-mentioned first, second, third and fourth conditions are all satisfied, even though the different-diameter tire is installed at the rear end of the vehicle.

Thereafter, when shifting from the straight-ahead, constant-speed driving state to the accelerating state or to the turning state, at least one of the first, second, third and fourth conditions is not satisfied. In this case, in the routine of FIG. 4, the procedure jumps from step S22 to step S33 so as to reset both the flags $F_{11}$ (flagging fulfillment of the first, second and third conditions) and F (flagging fulfillment of all the first, second, third and fourth conditions). Thus, in the routine of FIG. 3, the procedure flows from step S3 through step S11 (since the comparison operation between the two simple time-averaged wheel speed data VWRH and VWFH has already been made and thus $F_1$=1), and via step S12 (since the temper tire is installed at the rear end of the vehicle and thus $F_2$=1), and then to step S5. Thereafter, the flow proceeds from step S5 through steps S6, S16 and S17 and then advances to S18. There is a wheel-speed difference between rear- and front-wheel speeds, occurring due to faster-rotating drive wheels, during acceleration, which wheel-speed difference will be hereinafter referred to as an "acceleration dependent wheel-speed difference". There is a wheel-speed difference between the front and rear wheels when the vehicle is rounding a curve, which wheel-speed difference will be hereinafter referred to as a "wheel-travel-difference dependent wheel-speed difference". In case of the vehicle equipped with a temper tire, there is a so-called different-diameter-tire wheel-speed difference between rear- and front-wheel speeds. However, according to the arithmetic processing of the system of the invention, the different-diameter-tire dependent wheel-speed difference can be effectively removed by way of the operation of subtraction ($\Delta V - \alpha$) in case of the vehicle equipped with a different-diameter tire at the rear end or by way of the operation of addition ($\Delta V + \beta$) in case of the vehicle equipped with a different-diameter tire at the front end. Accordingly, the distribution of torque between front and rear wheels can be properly achieved in response to the acceleration dependent wheel-speed difference when accelerating, or in response to the wheel-travel-difference dependent wheel-speed difference when the right-angle turn or left-angle turn is made.

Suppose that either one of the rear-wheel speed sensing devices 52RL and 52RR becomes damaged and the damaged sensing device generates a zero-voltage signal, after the system has already decided that the vehicle is in the different-diameter-tire dependent wheel-speed difference detectable state through the routine shown in FIG. 4 and thus the flag $F_1$ (flagging fulfillment of the comparison operation between the two simple time-averaged wheel speed data VWRH and VWFH) has been set and the flag $F_2$ (flagging that the four-wheel-drive vehicle is equipped with a temper tire at rear end) has been set. In this case, in spite of that the temper tire is installed at the rear end of the vehicle, a negative wheel-speed difference $\Delta V$ is derived through step S1 of FIG. 3, since one of the two wheel-speed indicative data $V_{RL}$ and $V_{RR}$ is zero due to the faulty rear wheel-speed sensing device and thus the mean rear-wheel speed VWR is less than the mean front-wheel speed VWF. After step S1 of FIG. 3, the system executes the sub-routine shown in FIG. 4. If the first, second and third conditions are all satisfied for a while, the clutch engagement force T is computed on the basis of the negative wheel-speed difference data $\Delta V$, occurring due to the failure in the rear-wheel speed sensing device. As a result, the front wheel-spin begins to develop, since the torque is delivered to the front wheels in spite of that there is no wheel spin (no wheel skid) at the front and rear wheels. As a consequence, torque fluctuations take place due to the faulty sensing device for a while during the torque distribution control. The frequency range of the fluctuations in the clutch engagement force T is different from the specified frequency range (such as 3 to 5 Hz) of oscillation (hunting) which may occur at the transfer clutch of the vehicle equipped with the temper tire. Therefore, the oscillation-frequency of the torque fluctuations, resulting from the faulty wheel-speed sensing device, is outside of the specified frequency range (3–5 Hz, i.e., $9 \leq Xs+Ys \leq 15$) at step S31. Then the flag F is reset at step S33, since the predetermined frequency condition (or the fourth condition) is not satisfied. When the procedure shifts from the subroutine of FIG. 4 to step 3 of the routine of FIG. 3, the flow does not proceed from step S3 to step S4. That is, the system does not execute a new comparison operation between the simple time-averaged rear-wheel speed VWRH and the simple time-averaged front-wheel speed VWFH, in case that the frequency condition is not satisfied. In this manner, the comparison operation between the two wheel speed data VWRH and VWFH is performed only when the first, second, third and fourth conditions are all satisfied. Additionally the correction value (under a particular running condition wherein the vehicle is in the previously-noted different-diameter-tire dependent wheel-speed difference detectable state. On the supposition described previously, since the system has already decided that the comparison operation between the two wheel speed data VWRH and VWFH has already been made (thus $F_1$=1) and the temper tire is installed at the rear end of the vehicle (thus $F_2$=1), the procedure then flows from step S3 through steps S11, S12 and S5 to step S6 in which the wheel-speed difference data ΔV is corrected as a corrected wheel-speed difference data ΔV' by way of the operation of subtraction (ΔV−α). As discussed above, even when the processor derives a wheel-speed difference greater than the different-diameter-tire dependent wheel-speed difference owing to the failure in the wheel-speed sensing device, the system properly compensates for the wheel-speed difference ΔV to decrease the same on the basis of the correction value (α or β) which is selectable in accordance with the correct magnitude relationship between the two wheel speed data $V_{WRH}$ and $V_{WFH}$ only when the frequency condition as well as the first, second and third conditions are all satisfied. This prevents excessive torque from being delivered to the front wheels due to the damaged wheel-speed sensing device (or the wheel-speed sensor trouble), thereby avoiding the vehicle from being constantly maintained in a four-wheel-drivemode. Thus, the system enhances the driving stability and improves the fuel consumption, and also prevents the heat resistance of the power-train components from lowering.

Steps S26 through S31 (related to the frequency condition) is very important to precisely decide whether or not the torque fluctuations in the transfer clutch take place due to a different-diameter tire installed at the vehicle. Also, the system can determine by monitoring the oscillation-frequency of the engagement force T of the transfer clutch (the torque ΔT delivered to the front wheels), whether the torque fluctuations in the transfer clutch occur due to the different-diameter tire installed at the vehicle or due to the other factors such as the wheel-speed sensor trouble. That is, the oscillation-frequency of the clutch engagement force T monitored can be used as a failure criterion for a wheel-speed sensing device for example.

In the previously-discussed embodiment, although the torque distribution system is exemplified in case of a motor vehicle of a four-wheel drive and front engine rear drive type, it will be appreciated that the system of the invention may be applied to a motor vehicle of a four-wheel drive and front engine front drive type. The exemplified system provides a proper torque distribution between front and rear wheels by precisely correcting the wheel-speed difference between the rear- and front-wheel speeds, considering the different diameter-tire dependent wheel-speed difference in case that there is the difference in outside diameter between the front and rear wheels owing to the installation of the so-called temper tire. The system may be applicable to a proper torque distribution control between left and right wheels by precisely correcting the wheel-speed difference between the left- and right-wheel speeds, considering the different-diameter-tire dependent wheel-speed difference between left and right wheels in case that there is the difference in outside diameter between the left and right wheels owing to the installation of the temper tire. In the shown embodiment, although the microcomputer constructs the controller for the torque distribution control, the controller may be constructed by combining a plurality of electronic circuits such as a shift register, an arithmetic circuit and the like. Furthermore, although the hydraulic-pressure operated multiple-disk clutch is used as a transfer clutch, the hydraulic-pressure operated friction clutch may be replaced with an electromagnetic clutch that can vary an engagement force thereof. Also, the hydraulic-pressure operated clutch may be replaced by an air-pressure operated clutch or a water-pressure operated clutch. Moreover, as seen in FIG. 6, the correction values α and β are based on the vehicle speed V, these correction values α and β may be determined by properly filtering the difference ΔV in wheel speed between the front and rear wheels, being derived when the previously-noted conditions of the running-state discrimination processing shown in FIG. 4 are all satisfied. Also, although the hydraulic oil pump 35c employed in the fluid pressure source is driven by an electric motor 35a, the pump 35c may be driven by way of rotation of the engine of the vehicle.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A torque distribution control system for an automotive vehicle, comprising:

a friction clutch adapted to distribute a torque produced by a prime mover between front and rear road wheels or between left and right road wheels;

a sensing device provided for monitoring wheel speeds of said road wheels;

a control unit being responsive to said wheel speeds, for computing a wheel-speed difference between rear- and front-wheel speeds or between left- and right-wheel speeds and for computing a command signal value indicative of an engagement force of said friction clutch in response to said wheel-speed difference; and an actuating device connected to said friction clutch to actuate said friction clutch in response to said command signal value;

wherein said control unit has a processor for discriminating whether the vehicle is in a specified running state in which it is possible to precisely compute a specific wheel-speed difference, occurring due to a difference in outside diameter of tires fitted to said road wheels, wherein said processor decides whether fluctuations in said engagement force of said friction clutch take place due to a different-diameter tire installed at the vehicle, and wherein said processor compensates for said wheel-speed difference on the basis of said specific wheel-speed difference at the time when said processor decides that the vehicle is in said specified running state and said fluctuations in said engagement force take place due to said different-diameter tire installed.

2. A torque distribution control system as claimed in claim 1, wherein said control unit has a memory for pre-storing a specified frequency range of fluctuations in said engagement force, occurring due to a difference in outside diameter between said different-diameter tire and another tire of a usual outside diameter, and said processor decides that said fluctuations in said engagement force take place due to said different-diameter tire installed, when an oscillation-frequency of said fluctuations is within said specified frequency range.

3. A torque distribution control system as claimed in claim 2, wherein said processor counts a first number indicating how many times said engagement force exceeds a predetermined upper limit for a predetermined period of time and simultaneously counts a second number indicating how many times said engagement force becomes less than a predetermined lower limit for said predetermined period of time, and said processor decides whether said oscillation-frequency of said fluctuations is within said specified frequency range, by comparing a sum of said first and second numbers with a predetermined first value equivalent to a lower limit of said specified frequency range and with a predetermined second value equivalent to an upper limit of said specified frequency range.

4. A torque distribution control system as claimed in claim 1, wherein said specified running state comprises at least one of a first condition in which the vehicle is above a predetermined vehicle speed, a second condition in which the vehicle is traveling at a constant speed, and a third condition in which a turn is not made.

5. A torque distribution control system as claimed in claim 4, which further comprises a vehicle-speed sensing device for sensing a vehicle speed, a throttle-opening sensing device for sensing a throttle opening of a throttle valve, an engine-speed sensing device for sensing an engine speed, a longitudinal acceleration sensing device for sensing a longitudinal acceleration exerted on the vehicle, a brake lamp switch, a lateral acceleration sensing device for sensing a lateral acceleration exerted on the vehicle, and a steering angle sensing device for sensing a steering angle, and wherein said specified running state comprises the first condition in which said vehicle speed is above a predetermined value, the second condition in which positive and negative fluctuations in said vehicle speed are within a predetermined range of fluctuations, said throttle opening is within a predetermined throttle opening, positive and negative fluctuations in said engine speed are within a predetermined range of fluctuations, said longitudinal acceleration is within a predetermined range, and a signal from said brake pedal is maintained at a zero signal level, and the third condition in which said lateral acceleration is within a predetermined range and positive and negative fluctuations in said steering angle are within a predetermined range of fluctuations.

6. A torque distribution control system as claimed in claim 4, wherein said specified running state further comprises a condition in which at least one of said first, second and third conditions is satisfied for a predetermined period of time.

7. A method of varying a torque distribution between front and rear road wheels of an automotive vehicle or between left and right road wheels of the automotive vehicle, said vehicle having a variable-torque friction clutch for varying a torque distribution ratio of a torque delivered to said front wheels to a torque delivered to said rear wheels or a torque distribution ratio of a torque delivered to said left wheel to a torque delivered to said right wheel, said method comprising the steps of:

sensing wheel speeds of said road wheels;

computing a wheel-speed difference between rear- and front-wheel speeds or between left- and right-wheel speeds;

discriminating whether the vehicle is in a specified running state in which it is possible to precisely compute a specific wheel-speed difference, occurring due to a difference in outside diameter of tires fitted to said road wheels;

comparing a frequency of fluctuations in an engagement force of said friction clutch with a specified frequency range of fluctuations in said engagement force, occurring due to a difference in outside diameter between a different-diameter tire and another tire of a usual outside diameter;

deciding that fluctuations in an engagement force of said friction clutch take place due to a different-diameter tire installed at the vehicle when the vehicle is in said specified running state and the frequency of fluctuations in the engagement force of said friction clutch is within the specified frequency range; and compensating for said wheel-speed difference on the basis of said specific wheel-speed difference at the time when the vehicle is in said specified running state and the frequency of fluctuations in the engagement force of said friction clutch is within the specified frequency range.

8. A method of varying a torque distribution as claimed in claim 7, wherein said step of discriminating said specified running state includes a step determining that the vehicle is in a straight-ahead, constant-speed driving state above a predetermined medium speed for a predetermined period of time.

\* \* \* \* \*